Patented Feb. 19, 1924.

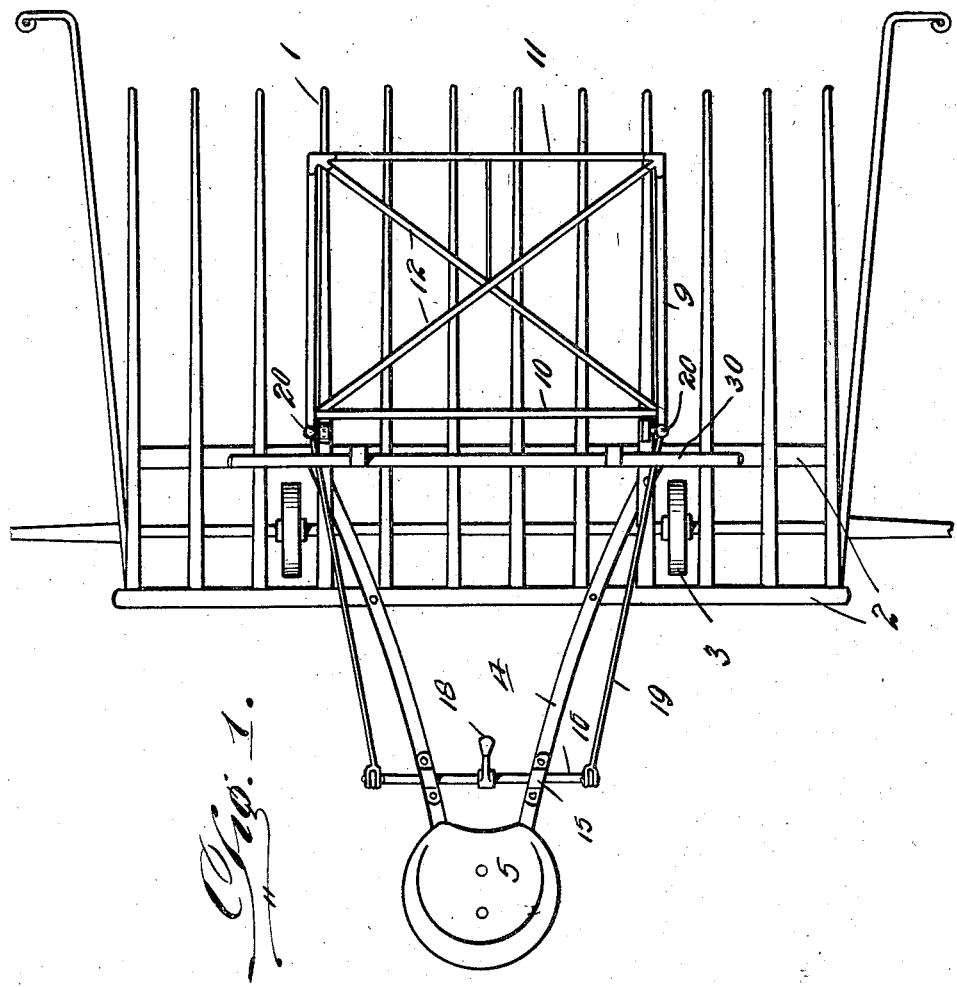

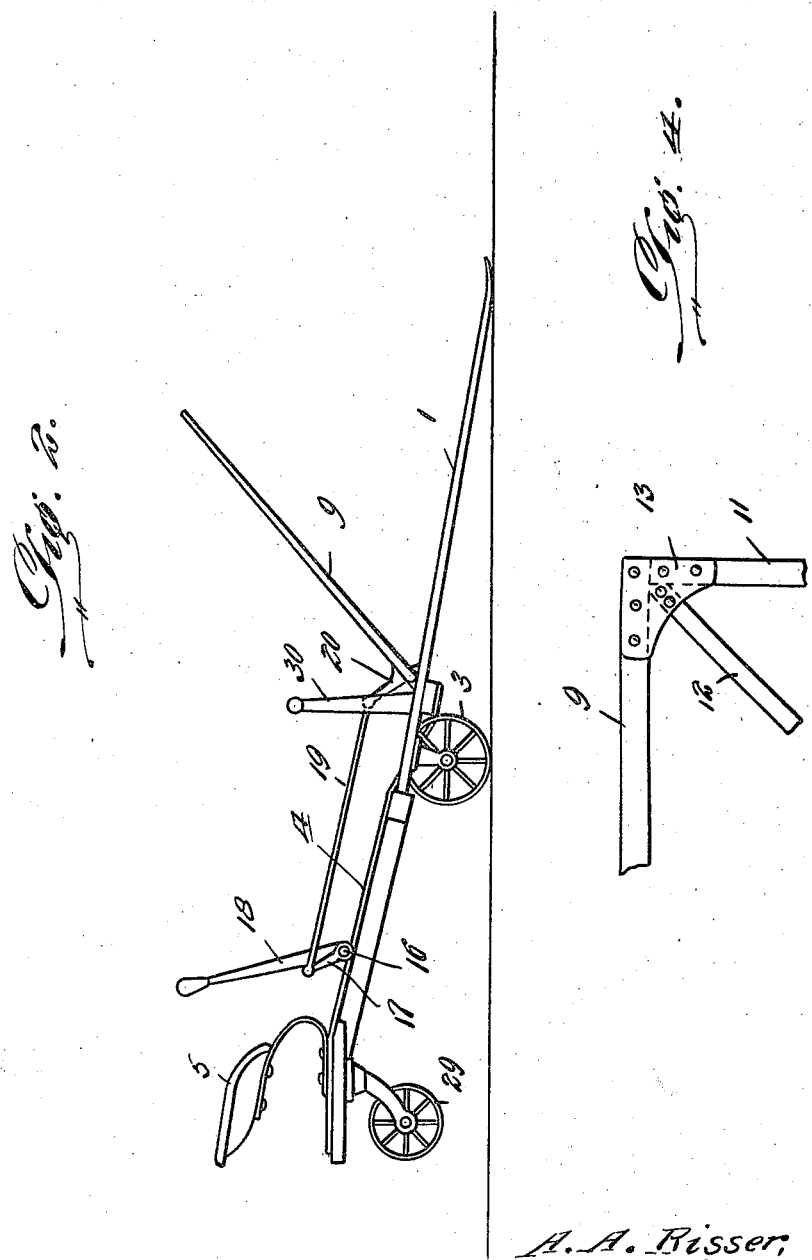

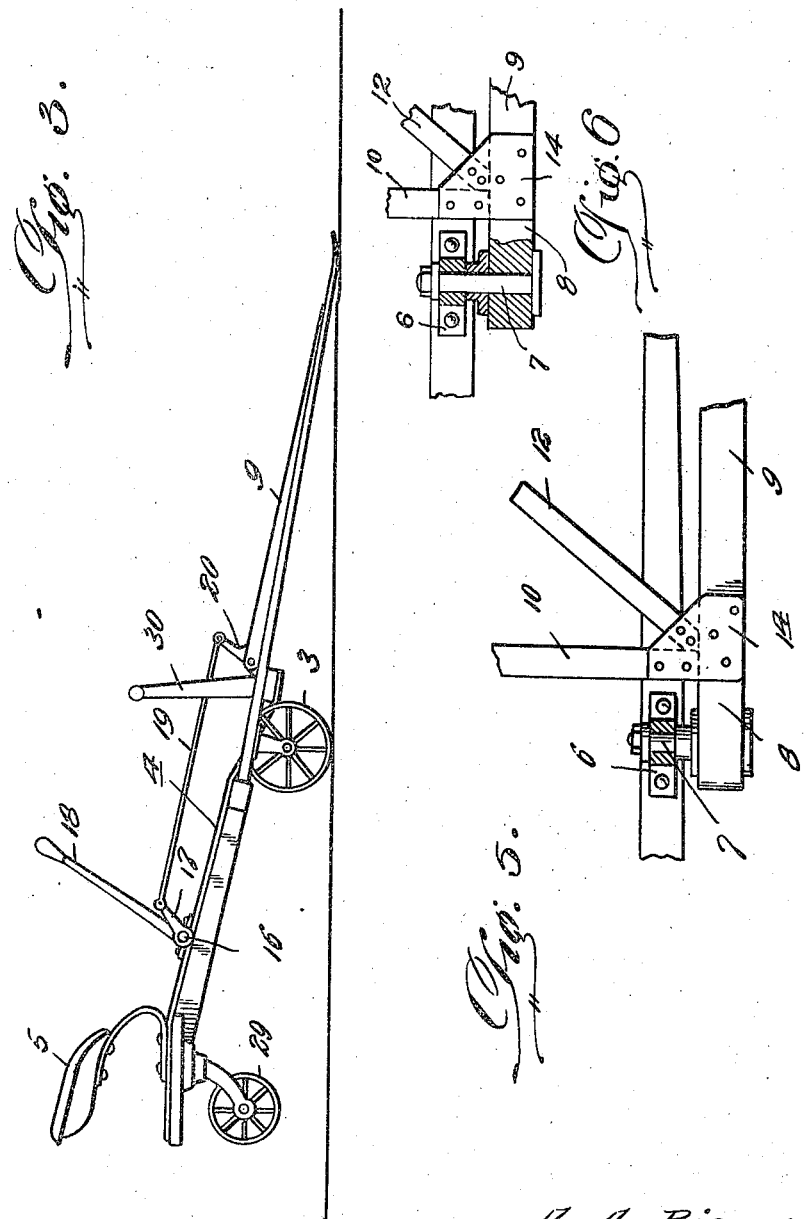

1,483,986

UNITED STATES PATENT OFFICE.

ANDREW A. RISSER, OF WISNER, NEBRASKA.

HAY PUSHER.

Application filed March 12, 1923. Serial No. 624,340.

*To all whom it may concern:*

Be it known that I, ANDREW A. RISSER, a citizen of the United States, residing at Wisner, in the county of Cuming and State of Nebraska, have invented certain new and useful Improvements in Hay Pushers, of which the following is a specification.

My present invention pertains to the handling of hay in the field; and it has for its object to provide a hay pusher adapted to be employed in connection with various kinds of hay sweeps, the said pusher serving to move to safety hay which ordinarily slides off stacker prongs, and also serving to prevent hay from sticking in the frame or falling from the rear thereof.

To the attainment of the foregoing, the invention consists in the improvement as hereinafter described and definitely claimed.

In the accompanying drawings, forming part of this specification:—

Figure 1 is a top plan view of a hay sweep equipped with my novel pusher.

Figure 2 is a side elevation of the same with the pusher raised.

Figure 3 is a side elevation with the pusher in its lowermost position.

Figure 4 is an enlarged detail of union of frame members of the pusher.

Figure 5 is an enlarged detail showing the preferred manner of swingably mounting the pusher on the sweep.

Figure 6 is an enlarged detail view showing the connection for mounting the pusher on the sweep in section indicating how it may be readily removed from connection with said sweep.

Similar numerals of reference designate corresponding parts in all of the views of the drawings.

The sweep is preferably of the general construction illustrated, and includes prongs 1, a frame 2 carrying the prongs 1 and mounted on ground wheels 3, an auxiliary frame 4, and a seat 5 for the driver on the rear portion of the frame 4.

In accordance with the preferred embodiment of my invention bearings 6 are fixed on certain of the prongs 1, and in the said bearings 6 are journaled inwardly-directed trunnions 7 carried by rearwardly-extended portions 8 of the side bars 9 of my novel pusher. The said bars 9 are in parallelism and are associated with and fixed with respect to cross-bars 10 and 11 and diagonal bars 12. By preference the said bars 9, 10, 11 and 12 are fixedly connected through the medium of outer and inner corner plates 13, and 14, respectively, which obviously lend increased stiffness and strength to the pusher notwithstanding the light, open-work character of the same.

Journaled in appropriate bearings 15 on the rear portion of the auxiliary frame 4 of the sweep is a rock-shaft 16 having upstanding cranks 17 and an upstanding lever 18, the latter within convenient reach of the driver on the seat 5. The said cranks 17 are connected by rods 19 or other appropriate means with upstanding arms 20 on the heel portion of the pusher adjacent to the side edges thereof. Through the medium of the means described the driver in the seat 5 is enabled to readily raise the pusher to the position shown in Figure 2—i. e., at an acute angle to the sweep prongs. It will also be understood that when the lever 18 is released the pusher will gravitate from the position shown in Figure 2 to that shown in Figure 3.

As best shown in Figures 2 and 3 the auxiliary frame 4 is provided under the seat 5 with an appropriately connected wheel 29 for limiting the downward movement of the auxiliary frame 4 under the weight of the driver in the said seat 5.

In the use of my pusher in connection with the sweep, the pusher is raised through the operation of the handle 18 by the operator in the seat 5, to the position shown in Figure 2 and the sweep is tilted to the position shown in this figure which places the parts in position to pick up a charge of hay from the ground in the forward movement thereof, the pusher preventing the hay from moving backward over the wheel at the rear end of the sweep. When raised the pusher is disposed at an obtuse angle to the sweep, and by leaning against the heel frame 30 of the sweep, the pusher prevents hay from sticking in the rear end of the sweep, and also prevents hay from "boiling" over the rear when a large load is taken. After a charge of hay is gathered in this manner on the sweep up against the pusher, the sweep is tilted so that the wheel 29 will ride on the ground and raise the prongs 1 from contact therewith after which the pusher is moved into proximity for the hay stacker which gathers the hay from the sweep and stacks it on a wagon or some other suitable conveyer. At this time the sweep is tilted downwardly again so that the prongs 1 engage the ground, the stacker picking up the hay from these prongs while the operator moves the handle 18 to rock the frame on its pivots for moving it toward the prongs 1 in order to pass the hay onto the stacker so that the stacker will receive the full charge of hay on the sweep, the pusher preventing hay from falling from the stacker over the rear end of the sweep. The operator in the seat 5 effectively controls the operation of the pusher through the medium of the handle 18 and the link 19.

Notwithstanding its practical advantages my novel pusher is simple and inexpensive in construction and light in weight, and it will also be understood that the pusher constructed as described is well adapted to withstand the usage to which devices of corresponding character are ordinarily subjected.

I have entered into a detailed description of the construction and relative arrangement of the parts embraced in the present and preferred embodiment of my invention in order to impart a full, clear and exact understanding of the said embodiment. I do not desire, however, to be understood as confining myself to the specific construction and relative arrangement of parts inasmuch as in the future practice of the invention various changes and modifications may be made such as fall within the scope of my invention as defined in my appended claim.

Having described my invention, what I claim and desire to secure by Letters Patent, is:—

A pusher attachment for a sweep including a rectangular frame member, diagonal members connecting opposite sides of said frame members, means for detachably pivoting said frame members to the prongs of the sweep, the said sweep having a frame extending rearwardly of the prongs thereof carrying an operator's seat, a shaft rotatably mounted on said frame adjacent the operator's seat and provided with a handle extending in proximity to said seat, laterally projecting arms on said shaft, laterally projecting arms on said rectangular frame, and links connecting the arms on said frame to the arms on said shaft, whereby the operator of the sweep may manually operate and control the movement of the pusher through the medium of the handle on said shaft and the links connecting the said laterally projecting arms.

In testimony whereof I affix my signature.

ANDREW A. RISSER.